United States Patent
Papousek

[15] 3,682,462
[45] Aug. 8, 1972

[54] SHOCK ABSORBERS FOR VEHICLES

[72] Inventor: Robert D. Papousek, 3233 East Third, Tucson, Ariz.

[22] Filed: Sept. 14, 1970

[21] Appl. No.: 72,019

[52] U.S. Cl. ................................................267/34
[51] Int. Cl. ...............................................B60g 11/56
[58] Field of Search........................................267/34

[56] References Cited

UNITED STATES PATENTS

| | | | |
|---|---|---|---|
| 2,905,458 | 9/1959 | Mason | 267/34 |
| 3,444,830 | 5/1969 | Doetsch | 267/34 |
| 1,207,426 | 12/1916 | McNabb | 268/34 |

*Primary Examiner*—James B. Marbert
*Attorney*—M. N. Cheairs and C. Ray Holbrook

[57] ABSTRACT

A shock absorber comprising a cylindrical body closed at both ends, a plunger disc lying within and across said cylindrical body in a plane perpendicular to the axis of said cylindrical body, said plunger disc being in sealed but slidable contact with the inner surface of said cylindrical body, a plunger rod connected at one end to said plunger disc substantially at the center of said plunger disc, said plunger rod extending through one end of said cylindrical body and being adapted at its other end for connection to a vehicle supporting or conveyancing member of said vehicle, said cylindrical body being adapted at the end thereof opposite to the end through which said plunger rod extends, for attachment to the other of said vehicle supporting or conveyancing members, and at least one coil spring substantially concentrically aligned with the axis of said cylindrical body and lying within said cylindrical body, said coil spring extending between said plunger disc and the inner surface of an end of said cylindrical body.

9 Claims, 2 Drawing Figures

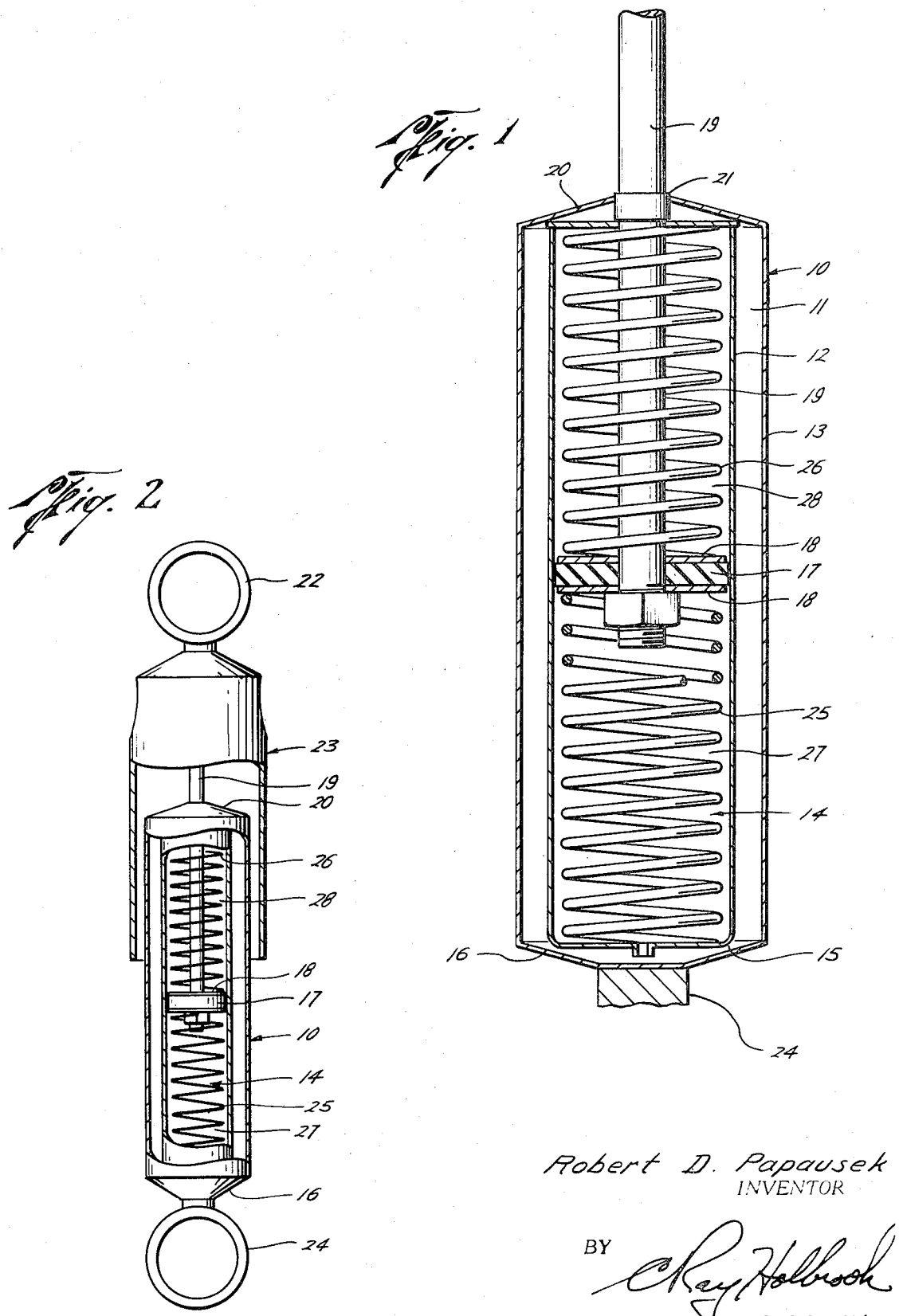

SHOCK ABSORBERS FOR VEHICLES

BACKGROUND OF THE INVENTION

The present invention relates to a new and improved shock absorber for motor vehicles. Particularly, the present invention is concerned with a shock absorber to be used on either the front or back of motor vehicles to act in tension as well as compression.

Generally, suspension units for motor vehicles include a telescopic hydraulic shock absorber for heavy loads. In circumstances where a vehicle suspension already incorporating telescopic shock absorbers proves unsatisfactory in use because it is too soft for the load conditions which it experiences, then combined suspension units are useful in enabling the vehicle suspension to be stiffened or otherwise modified without major structural changes, simply by directly adding a coil spring, sometimes called an overload spring, externally around the shock absorber to act in compression. This is frequently employed on pick up trucks used for heavy loads or for campers installed on pick up trucks. Frequently, this so-called overload spring is used on automobiles or station wagons for supporting trailers or heavy loads on the back, for instance, a new type of camper designed to be carried on a station wagon. In nearly all cases, the compression overload springs are installed on the rear shock absorbers to support the heavy rear load.

The purpose of all automobile and other vehicle suspension systems between the wheels and the frame of the automobile or other vehicle is to support the vehicle's body and frame upon the wheels and provide the means of absorbing road shock caused by passage of the wheels over irregularities. In general, there are four major types of springs used for such suspension. These are leaf springs, coil springs, torsion bar springs and air or liquid hydraulic springs. The weight of the automobile or other vehicle applies on initial compression to the springs and when the wheels encounter irregularities in the highway or earth surface, the springs further compress to absorb additional shock. The springs may, also compress considerably due to heavy loading of the vehicle or due to banking or leaning of the vehicle during the negotiation of turns or curves at high speed. Shock absorbers are used as noted above, in conjunction with or as a replacement for springs to restrain excessive spring movement and prevent prolonged oscillations, which would afford a generally rougher ride. The most serious problem, however, with all the various types of suspension systems for vehicles either as a spring of the type mentioned above or a combination of spring and shock absorber for heavy loads is that the front, in particular, of the automobile or other vehicle always rides high and has a definite tendency to bounce when passing over highway or earth's irregularities thereby creating an uncomfortable ride resulting in poor control of the vehicle.

It is now an object of the present invention to provide an improved suspension system for vehicles.

An additional object of the present invention is to provide an improved suspension system for vehicles which operates in tension as well as in compression thereby equalizing the front and rear levels of a heavily loaded vehicle.

A particular object of the present invention is to provide a new and improved shock absorber which may be used on either the front or the rear of a vehicle and which operates in tension as well as compression and which substantially alleviates the problem of uncomfortable ride and poor control due to the front end of heavily loaded vehicles riding significantly higher than the rear end thereof.

Additional objects will become apparent from the following description of the invention herein disclosed.

SUMMARY OF THE INVENTION

The above and other objects are accomplished by the present invention which is a shock absorber comprising a cylindrical body closed at both ends, a plunger disc lying within and across said cylindrical body in a plane perpendicular to the axis of said cylindrical body, said plunger disc being in sealed but slidable contact with the inner surface of said cylindrical body, a plunger rod connected at one end to said plunger disc substantially at the center of said plunger disc, said plunger rod extending through one end of said cylindrical body and being adapted at its other end for connection to a vehicle supporting or conveyancing member of said vehicle, said cylindrical body being adapted at the end thereof opposite to the end through which said plunger rod extends, for attachment to the other of said vehicle supporting or conveyancing members, and at least one coil spring substantially concentrically aligned with the axis of said cylindrical body and lying within said cylindrical body, said coil spring extending between said plunger disc and the inner surface of an end of said cylindrical body. In a particularly useful embodiment of the present invention, a pair of coil springs is provided within said cylindrical body, said pair of coil springs being substantially concentrically aligned with the axis of said cylindrical body, one of said coil springs surrounding said plunger rod and extending between said plunger disc and the inner surface of the end of said cylindrical body through which said plunger rod extends, the other of said coil springs lying within said cylindrical body and extending from the other surface of said plunger disc to the inner surface of the end of said cylindrical body opposite that through which the plunger rod extends.

By means of the above described present invention, a suspension system for vehicles which supports in tension as well as compression, is provided.

DESCRIPTION OF THE DRAWINGS OF THE PRESENT INVENTION

FIG. 1 of the drawings is a cross section of the apparatus of the present invention showing the positioning of a pair of coil springs within the cylindrical body.

FIG. 2 of the drawings is a cut-away-view of a different embodiment of the shock absorbers of the present invention showing the internal parts of the apparatus and including means for attachment of said shock absorber to a vehicle supporting member, i.e.: the frame, and a vehicle conveyancing member, i.e., a wheel or axle.

DESCRIPTION OF THE PREFERRED EMBODIMENTS OF THE PRESENT INVENTION

In order to more fully describe and to illustrate the preferred embodiments of the present invention, reference is made to the accompanying drawings. In the drawings, the same characters are used throughout to denote like features of the present invention.

Referring to the drawings, the shock absorber of the present invention includes a cylindrical body 10. This cylindrical body may have a solid wall or may comprise a wall structure as shown particularly in FIG. 1, having an annular space 11 between an inner wall 12 and an outer wall 13. The annular space 11 shown in FIG. 1 serves to provide a fluid reservoir for the hydraulic fluid, if any, employed in the shock absorber. In this embodiment, the shock absorber fluid is exchanged between annular space 11 and inner chamber 14 of cylindrical body 10 by means of openings 15 provided adjacent the end 16 of cylindrical body 10.

In other embodiments of the present invention, no annular space 11 is provided as a fluid reservoir. While generally used, normal hydraulic fluid in the shock absorbers of the present invention is not necessary. Therefore, the use of such and the reservoir 11 or other similar reservoir with respect to the present shock absorbers is optional.

Referring again to FIG. 1, there is disposed within chamber 14 of cylindrical body 10 a plunger disc 17, the principal plane of which is substantially perpendicular to the axis of cylindrical body 10. Plunger disc 17 is of substantially the same diameter as chamber 14 being of only such lesser diameter as is required to permit plunger disc 17 to move up and down through chamber 14 in slidable but substantially sealed contract with the inner surface of wall 12 of cylindrical body 10.

Connected to one of the faces 18 of plunger disc 17 is a plunger rod 19 which is connected to the face 18 at approximately its center. Plunger rod 19 extends from face 18 substantially along the axis of cylindrical body 10 through end 20 of cylindrical body 10. An opening 21 in end 20 is provided for passage therethrough of plunger rod 19. Opening 21 is adapted, along with plunger rod 19, to permit a slidable and preferably, sealed contact between the surfaces of opening 21 and the outer surface of plunger rod 19. When cylindrical body 10 comprises two sections as it may, one overlapping the other in slidable and sealed contact therewith, plunger disc 17 and plunger rod 19 operate in substantially the same manner as when cylindrical body 10 comprises a single unit. As used herein, "-sealed contact" refers to a contact which will at least substantially prevent the passage of hydraulic or lubricating fluids between the contacting surfaces of the members with respect to which the term is used.

Plunger rod 19 is adapted at its outer end with a connecting member 22 as shown in FIG. 2, which permits attachment of the plunger rod 19 to either a supporting or conveyancing member of a vehicle. In this manner, depending upon choice, the connecting member 22 and thus, plunger rod 19 may be connected to the frame of a vehicle or in the alternative, may be connected to the wheel or axle of the vehicle. In the embodiment of the present invention shown in FIG. 2, a shield 23 is provided. Shield 23 is open at one end and has internal diameter approximately the same but just larger than the outer diameter of cylindrical body 10. The upper end of shield 23 is closed and attached at approximately the center of such closed end to approximately the outer end of plunger rod 19. The length of shield 23 is such that in non-loaded or normal position, it will partially overlie and surround cylindrical body 10. The purpose of shield 23 is to protect the sliding surface of plunger rod 19.

The other end 16 of cylindrical body 10 is provided with a connecting member 24 which permits connection of cylindrical body 10 according to choice, to either a supporting member or a conveyancing member of a vehicle. In operation, connecting member 24 of end 16 usually is connected to a conveyancing member of a vehicle, i.e., a wheel or axle, while connecting member 22 of plunger rod 19 is connected to a supporting member, i.e., the frame, of the vehicle.

In accordance with the present invention, as illustrated in FIGS. 1 and 2, disposed within chamber 14 of cylindrical body 10 are a pair of coiled springs, one being designated spring 25 and the other being designated spring 26. Spring 25 is disposed within chamber portion 27 of chamber 10 which is formed between plunger disc 17 and the end of cylindrical body 10 opposite plunger rod 19. One end of spring 25 lies in contact with one of the faces 18 of plunger disc 17 while the other end lies in contact with the inner surface of end 16. While it is unnecessary to connect the terminal end of spring 25 with the inner surface of end 16 and the face of plunger 18, if desired, the terminal end may be fixedly connected thereto.

Spring 26 lies within chamber portion 28 of chamber 10 formed by the other face 18 of plunger disc 17 and the inner surface of end 20 of cylindrical body 10. Spring 26 surrounds and is substantially concentrically aligned with plunger rod 19. One of the terminal ends of spring 26 lies in contact with said face 18 of plunger disc 17 while the other terminal end lies in contact with the inner surface of end 20. As with spring 25, spring 26 may be connected if desired, at both of the terminal ends to the surfaces with which it is in contact.

While FIGS. 1 and 2 illustrate the use of a coil spring both above and below plunger disc 17, the shock absorber of the present invention may employ only a single such spring which may be positioned either above or below plunger disc 17.

While the coil springs have been shown in a substantially cylindrical form, it is somewhat preferred that for many purposes these springs be somewhat conical in shape. Such conical shape permits greater compression of the spring without expansion or bending into contact with the inner wall of chamber 10, thereby substantially reducing wear of the surface of such inner wall. Of course, the coil springs, as springs 25 and 26, may take other shapes but so long as such shapes still permit compression and expansion, the normal function of the spring, such shapes are within the spirit and scope of the present invention.

While the shock absorber of the present invention has been shown in FIG. 1 as having an annular shock absorber fluid reservoir, such is not required. If a shock absorber fluid is to be used, the reservoir therefor may be placed in an end of the shock absorber rather than in the annular space shown in FIG. 1. Further, it is not even necessary in all utilities that a shock absorber fluid be used with the shock absorber of the present invention. Therefore, in such instances the shock absorber fluid reservoir may be dispensed with entirely.

In operation, the shock absorber of the present invention is connected at one end to a vehicle frame or other body supporting member. At the other end, it is connected to a wheel base, axle or other conveying member. Connection may be through connecting member 22 being connected to a vehicle frame and with connecting member 24 being connected to the vehicle wheel base or axle. By such connection, plunger rod 19 is connected to the frame with cylindrical body 19 being connected to the wheel base. As the vehicle wheel passes over "bumps" or as the vehicle body becomes loaded above normal, plunger rod 19 and thus, plunger disc 17 are compressed toward the opposite end 16 of the cylindrical body 10 thereby compressing spring 25 which in compression, absorbs much of the force of the downward thrust of plunger disc 17 while simultaneously exerting force against the lower face 18 of plunger disc 17 to thereby help restore plunger disc 17 to normal position.

If upper spring 26 is connected at its ends as hereinabove discussed, then the compression of coil spring 25 results in expansion of this spring. Such expansion results in this spring absorbing much of the downward force of said plunger rod. Also, such expansion of spring 26 results in spring 26 exerting upward force upon plunger disc 17 to thereby aid in restoring the plunger disc 17 to normal position.

Particularly with heavy loads, if the rear of the vehicle is forced downward to thereby compress plunger disc 17 toward the lower end 16 of cylindrical body 10, then the front of the vehicle rises thereby causing plunger disc 17 to be pulled upward through cylindrical body 10 toward end 20 of such cylindrical body of said shock absorbers on the front of said vehicle. Such movement of plunger disc 17 results in compression of upper spring 26 which exerts force against the upper face 18 of plunger disc 17 to restore such plunger disc to normal position. If lower spring 25 is attached at its ends as hereinabove discussed, then the upward movement of plunger disc 17 will act to expand such lower spring 25 thereby causing said lower spring 25 also to exert force downwardly in contraction upon plunger disc 17. Such downward force also works to restore plunger disc 17 to normal position.

By the action of the pair of springs within the shock absorbers as hereinabove described, whether such springs are connected at the ends thereof or not, a vehicle body may be more readily maintained in a substantially more level position than with conventional shock absorbers. Also, the ability of such shock absorbers to absorb road shock is greatly increased.

What is claimed is:

1. A shock absorber comprising a cylindrical body closed at both ends, a plunger disc lying within and across said cylindrical body, said plunger disc being in sealed but slidable contact with the inner surface of said cylindrical body, a plunger rod connected at one end to said plunger disc substantially at the center of said plunger disc, said plunger rod extending through one end of said cylindrical body and being adapted at its other end for connection to a vehicle supporting or conveyancing member of said vehicle, said cylindrical body being adapted at the end thereof opposite to the end through which said plunger rod extends, for attachment to the other of said vehicle supporting or conveyancing members, and at least one coil spring substantially concentrically aligned with the axis of said cylindrical body and lying within said cylindrical body, said coil spring extending between said plunger disc and the inner surface of an end of said cylindrical body and attached at one end to said plunger disc and at the other end to said inner surface.

2. The shock absorber of claim 1 wherein said cylindrical body is provided with a pair of said coil springs, one of said coil springs surrounding said plunger rod and extending between said plunger disc and the end of said cylindrical body through which said plunger rod extends, the other of said coil springs lying within said cylindrical body and extending from the other surface of said plunger disc to the inner surface of the end of said cylindrical body opposite that through which the plunger rod extends.

3. The shock absorber of claim 1 wherein only one said coil springs is provided.

4. The shock absorber of claim 3 wherein said one coil spring lies within the end of said cylindrical body through which said plunger rod operates.

5. The shock absorber of claim 1 wherein a reservoir for shock absorber fluid is provided, said reservoir being in open communication with the interior of said cylindrical body.

6. The shock absorber of claim 5 wherein said reservoir is an annular space surrounding said cylindrical body.

7. The shock absorber of claim 5 wherein said reservoir is in a chamber within an end wall of said cylindrical body.

8. The shock absorber of claim 1 wherein said coil spring is cylindrical in shape.

9. The shock absorber of claim 1 wherein said coil spring is conical in shape.

* * * * *